United States Patent
Park

(10) Patent No.: US 10,082,817 B2
(45) Date of Patent: Sep. 25, 2018

(54) METHOD AND APPARATUS FOR CONTROLLING POWER OUTPUT FROM ELECTRONIC DEVICE TO EXTERNAL ELECTRONIC DEVICE

(71) Applicant: Samsung Electronics Co., Ltd., Suwon-si, Gyeonggi-do (KR)

(72) Inventor: Jong-Hun Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 14/607,534

(22) Filed: Jan. 28, 2015

(65) Prior Publication Data

US 2015/0253798 A1    Sep. 10, 2015

(30) Foreign Application Priority Data

Mar. 10, 2014    (KR) .................. 10-2014-0027668

(51) Int. Cl.
| | | |
|---|---|---|
| H01H 47/00 | (2006.01) | |
| H01H 83/00 | (2006.01) | |
| H02J 7/00 | (2006.01) | |
| G05F 3/02 | (2006.01) | |
| G06F 1/26 | (2006.01) | |

(52) U.S. Cl.
CPC .............. *G05F 3/02* (2013.01); *G06F 1/266* (2013.01); *Y10T 307/766* (2015.04); *Y10T 307/826* (2015.04)

(58) Field of Classification Search
CPC . G06F 1/26; G06F 1/3203; G06F 1/30; G06F 1/24; G06F 1/305

USPC .......................................... 307/125; 713/300
See application file for complete search history.

(56) References Cited

U.S. PATENT DOCUMENTS

| | | | |
|---|---|---|---|
| 8,626,932 B2* | 1/2014 | Lydon ................... | G06F 13/385 709/228 |
| 8,683,090 B2* | 3/2014 | Mullins ................... | G06F 21/44 320/114 |
| 2004/0225836 A1* | 11/2004 | Lin ........................ | G06F 13/385 711/115 |
| 2008/0222341 A1* | 9/2008 | Lin ........................ | G06F 13/426 710/316 |
| 2008/0222438 A1 | 9/2008 | Lin et al. | |
| 2012/0246350 A1* | 9/2012 | Lee ........................ | H02J 7/0008 710/16 |
| 2012/0271979 A1 | 10/2012 | Considine et al. | |
| 2013/0275779 A1* | 10/2013 | He ............................ | G06F 1/26 713/300 |
| 2014/0070758 A1* | 3/2014 | Zhou ..................... | H01M 10/44 320/103 |

* cited by examiner

*Primary Examiner* — Quan Tra
(74) *Attorney, Agent, or Firm* — Jefferson IP Law, LLP

(57) ABSTRACT

A method for controlling a power output by an electronic device is provided. The method includes determining whether power is supplied by the electronic device to an external electronic device, by checking a connection unit of the electronic device, determining whether data communication with the external electronic device is possible, based on the determination, and controlling the output of power through the connection unit, based on a result of the determination of whether the data communication is possible.

19 Claims, 4 Drawing Sheets

METHOD AND APPARATUS FOR CONTROLLING POWER OUTPUT FROM ELECTRONIC DEVICE TO EXTERNAL ELECTRONIC DEVICE

CROSS-REFERENCE TO RELATED APPLICATION(S)

This application claims the benefit under 35 U.S.C. § 119(a) of a Korean patent application filed on Mar. 10, 2014 in the Korean Intellectual Property Office and assigned Serial number 10-2014-0027668, the entire disclosure of which is hereby incorporated by reference.

TECHNICAL FIELD

The present disclosure relates to an electronic device including a connector. More particularly, the present disclosure relates to a method of controlling a power output from the electronic device to an external electronic device.

BACKGROUND

Recently, various connection interfaces, which are used for a connection between electronic devices, have been proposed with the development of electronic devices. Here, the connection interface, for example, may be Universal Serial Bus (USB), BLUETOOTH, Wi-Fi, and P2P (Peer to Peer). A Personal Computer (PC) can be connected to its peripheral devices by using this connection interface. Meanwhile, recently, as the prevalence of a portable electronic device such as a smart phone has proliferated, the connection interface technologies between peripheral devices without a PC have been proposed. Through this connection interface between peripheral devices, the peripheral devices can supply power to a connected external electronic device, and also perform data communication with the external electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device connected to an external electronic device. The electronic device connected to the external electronic device may be a portable device.

Due to the characteristic of portability, the portable device can be affected by an external environment, and thus an alien substance or moisture can be introduced to the portable device. However, if the alien substance or moisture is introduced to a connector, the electronic device may determine as if it were normally connected to the external electronic device, even though it is not actually connected to the external electronic device.

Another aspect of the present disclosure is to provide an electronic device that may continue to supply power to the external electronic device through a connection unit, by determining that the external electronic device, which is not connected to it, were normally connected to it. Thus, if power is supplied to the external electronic device which is not connected to the electronic device, such as this, corrosion in the connector which inputs or outputs a signal in the connection unit can occur. Further, if power is supplied to the external electronic device which is not connected to the electronic device through the connector, a charging failure and a communication failure can occur in the corresponding external electronic device. Therefore, a problem in that the connector can be overheated by supplying unnecessary power to the external electronic device, which is not connected to the electronic device to receive the power, may occur.

The electronic device of the present disclosure provides a method for controlling a power output from the electronic device to the external electronic device by recognizing that the connector is in an abnormal connection state.

According to an embodiment of the present disclosure, a method for controlling a power output by an electronic device is provided. The method includes determining whether power is supplied by the electronic device to an external electronic device, by checking a connection unit of the electronic device, determining whether data communication with the external electronic device is possible, based on the determination, and controlling an output of power through the connection unit, based on a result of the determination of whether the data communication is possible.

According to another embodiment of the present disclosure, an electronic device for controlling a power output is provided. The electronic device includes a connection unit, a power supply configured to output power to an external electronic device through the connection unit, and a controller configured to determine whether power is to be supplied by the electronic device to the external electronic device, by checking the connection unit, to determine whether data communication with the external electronic device is possible, according to the determination, and to control the power supply, according to a result of the determination of whether the data communication with the external electronic device is possible.

The electronic device according to various embodiments of the present disclosure may control a power output by recognizing that the connector is in an abnormal connection state. Therefore, corrosion of the connector which can occur due to the power output through the connector in an abnormal connection state may be prevented.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
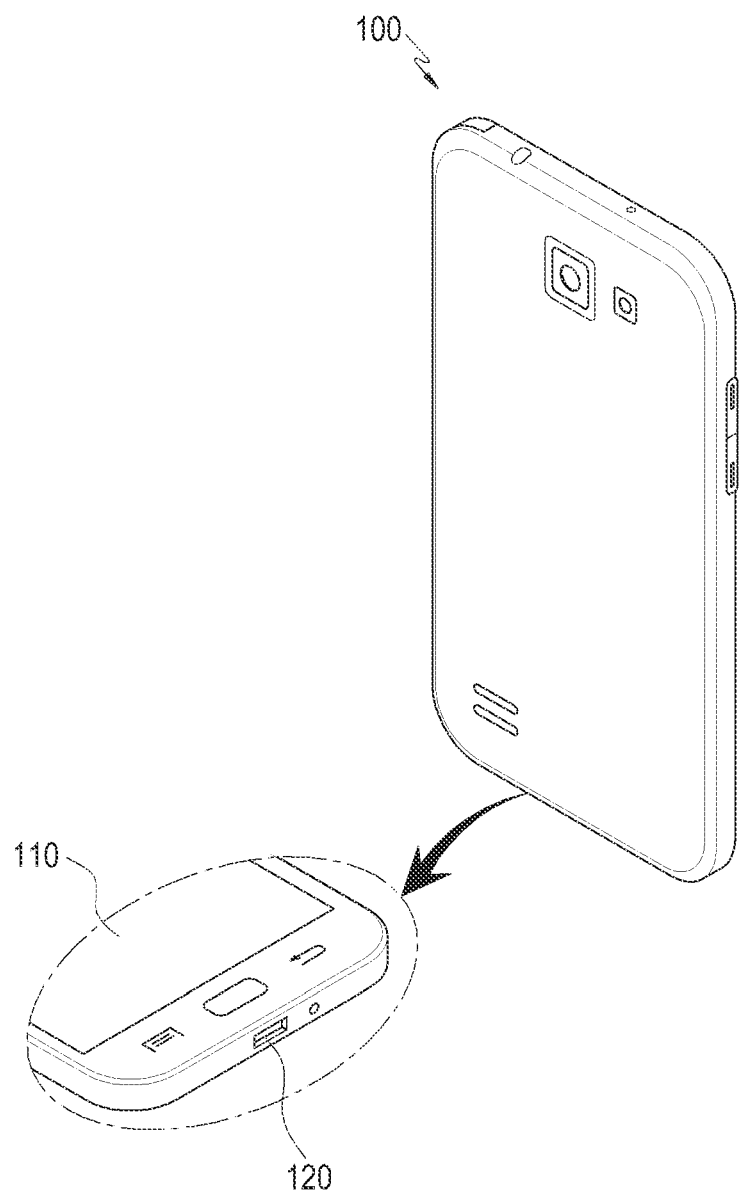
FIG. 1 is a schematic view illustrating an electronic device to according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the terms including an ordinal number such as first, second, etc. can be used for describing various elements, the elements are not restricted by the terms. The terms are only used to distinguish one element from another element. For example, without departing from the scope of the present disclosure, a first structural element may be named a second structural element. Similarly, the second structural element also may be named the first structural element. As used herein, the term "and/or" includes any and all combinations of one or more of the associated listed items.

The terminology used in this application is for the purpose of describing particular embodiments only and is not intended to limit the disclosure. Singular forms are intended to include plural forms unless the context clearly indicates otherwise. In the description, it should be understood that the terms "include" or "have" indicate existences of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

The electronic device according to various embodiments of the present disclosure may be a device including a communication function. For example, one or more among various devices such as smart phone, tablet personal computer, mobile phone, video phone, e-book reader, desktop personal computer, laptop personal computer, netbook computer, Personal Digital Assistant (PDA), Portable Multimedia Player (PMP), MP3 player, mobile medical device, electronic bracelet, e-necklace, electronic accessory, camera, wearable device, electronic clock, wrist watch, home appliance (example: refrigerator, air conditioning, cleaner, oven, microwave, washer, air purifier, etc.), cybot, television (TV), Digital Versatile Disk (DVD) player, stereo, various medical devices (example: Magnetic Resonance Angiography (MRA), Magnetic Resonance Imaging (MRI), Computed Tomography (CT), imaging device, ultrasonic device, etc.), navigation device, Global Positioning System (GPS) receiver, Event Data Recorder (EDR), Flight Data Recorder (FDR), set-top box, TV box (for example, Samsung Home-Sync™, Apple TV™, or Google TV™), electronic dictionary, automotive infotainment device, electronic equipment for ship (for example, navigation system for ship, gyro compass, etc.), avionics, security device, electronics apparel, electronic key, camcorder, game consoles, Head-Mounted Display (HMD), flat panel display device, digital photo frame, electronic album, a part of furniture or buildings/structures including communication function, electronic board, electronic signature receiving device, or projector may be combined. It is obvious to those skilled in the art that the electronic device according to the present disclosure is not limited to the aforementioned devices.

FIG. 1 is a view illustrating an example of an electronic device according to an embodiment of the present disclosure.

Referring to FIG. 1, an electronic device 100, for example, may be a smart phone. The electronic device 100 may include a display 110 and a connector 120. As a Universal Serial Bus (USB) cable is contacted to the connector 120 and the USB cable is connected to a connector of an external electronic device, the electronic device 100 is connected to the external electronic device. Here, the external electronic device, for example, includes a USB memory, a mouse, a tablet Personal Computer (PC), a projector, and a USB fan. Thereafter, the electronic device 100 may communicate with the external electronic devices or may supply power to a specific external electronic device through the connector 120.

Figure 2:
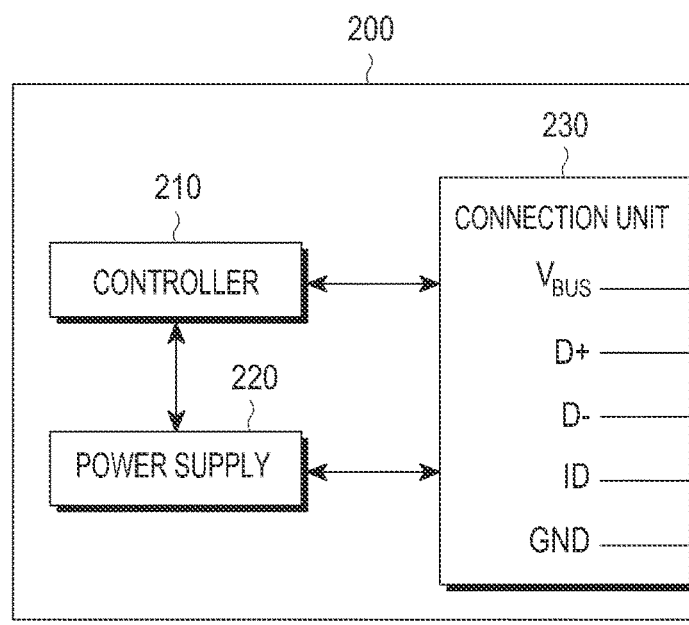
FIG. 2 is a view illustrating an example of an electronic device configuration according to an embodiment of the present disclosure.

FIG. 2 is a view illustrating an example of an electronic device configuration according to an embodiment of the present disclosure.

Referring to FIG. 2, an electronic device 200 may include a controller 210, a power supply 220, and a connection unit 230.

The controller 210 may control the overall operation of the electronic device 200. For example, the controller 210 may control a power output to the external electronic device by identifying a signal of the external electronic device input through the connection unit 230. For example, the controller 210 may recognize that the electronic device is connected to the external electronic device, based on a result which measured the signal of the external electronic device. Thus, the controller 210 may control the power supply 220 to output power to the external electronic device. Further, the power supply 220 which detected a control signal from the controller 210 may output the power to the external electronic device connected through the connection unit 230.

In an embodiment, the connection unit 230 may include the connector 120. Further, the connection unit 230 may control to transmit a signal detected through the connector 120 to the inside of the electronic device. Here, a signal from the external electronic device may be transmitted to the connector. For example, the connector may include a pin from which power is output, a pin through which data is input and output, and a pin to which a signal, which can identify the external electronic device, is input. For example, the pins may be a bus voltage (VBUS) pin, an identification (ID) pin, a positive data line (D+) pin, a negative data line (D−) pin, and a ground (GND) pin. Further, the connector including the VBUS pin, the ID pin, the D+ pin, the D− pin, and the GND pin may be a Micro USB, a Mini USB, and the like.

The controller 210 may recognize the external electronic device by using an input on the ID pin. For example, the controller 210 may recognize that the external electronic device is connected, by measuring a signal transmitted to the ID pin. For example, the controller 210 may recognize the external electronic device by measuring an internal resistance value of the external electronic device connected to the ID pin, through the ID pin. In an embodiment, the controller 210 may identify the external electronic device by identifying the determined internal resistance value. For example, if the signal measured in the ID pin has a preconfigured value (for example, 0 to 32 ohm), the controller 210 may recognize that the external electronic device, to which power may be supplied from the electronic device 200, is connected. Here, the external electronic device to which power may be supplied, as an example, may be an electronic device supporting a USB On The Go (OTG) connection. Thereafter, the controller 210 may determine to supply power to the identified external electronic device. Further, the controller 210 may control the power supply 220 to supply power to the external electronic device. The supplied power may be output through the VBUS pin.

Meanwhile, the controller 210 may measure a signal input through the ID pin. The controller 210, if the measured signal has a value other than a preconfigured value, may control the power supply 220 to prevent power from being output to the VBUS pin.

Figure 3:
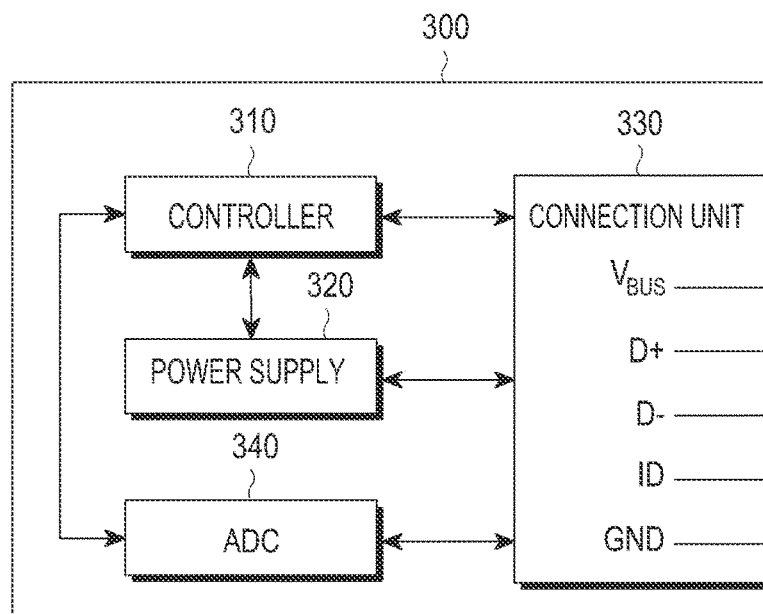
FIG. 3 is a view illustrating an another example of an electronic device configuration to which an embodiment of the present disclosure is applied.

FIG. 3 is a view illustrating another example of an electronic device configuration according to an embodiment of the present disclosure.

Referring to FIG. 3, an electronic device 300 may further include an Analog to Digital Converter (ADC) 340. Here, the ADC 340 may convert an analog signal transmitted from at least one pin included in a connection unit 330 into a digital signal. The ADC 340 may transmit the converted signal to a controller 310. For reference, the ADC 340 separated from the controller 310 was illustrated in FIG. 3, but the ADC 340 may be omitted if the controller 310 performs a function of the ADC 340.

Thereafter, the ADC 340 may convert a signal input and output through the D+ pin or the D− pin. The controller 310 may determine that the connected external electronic device may communicate with the electronic device 300, by measuring the signal converted by the ADC 340. Further, the controller 310 may also determine whether the communication between the electronic device 300 and the external electronic device is possible, by identifying a feedback signal transmitted by the external electronic device. In the embodiment, a case having two pins (D+ and D−) through which data is input and output was provided as an example, but the pins through which data is input and output may be one or more.

Thereafter, the controller 310 may determine whether the power should be output to the external electronic device, of which it is determined that data communication is possible, based on the result of measuring the signal converted by ADC 340. For example, the controller 310 may control to maintain the power output if data communication of the external electronic device is possible, and control to maintain the power output if data communication of the external electronic device is impossible, while no power is being output. For example, the controller 310 may transmit a signal for determining whether data communication with the external electronic device is possible. Further, if a response to the signal for determining that data communication to the external electronic device is possible is not received within a preconfigured time, the controller 310 may determine that data communication with the currently connected external electronic device is not possible.

Further, the controller 310 according to an embodiment of the present disclosure may determine whether data communication is possible and then determine whether the external electronic device controlled to prevent power from being output is a device to which only power may be supplied. For example, whether the external electronic device is a device to which only power may be supplied may be determined by a user by displaying an identification request message on a display of the electronic device 300. Thereafter, the controller 310 may control to output power even when data communication is impossible, to the external electronic device determined as a device to which only power may be supplied.

For example, the electronic device for controlling power output according to various embodiments of the present disclosure may include a connection unit and a controller for determining whether power is supplied, by checking the connection unit, determining whether data communication with the external electronic device is possible, based on the determination, and controlling the power supply based on a result of the determination of whether data communication is possible.

The controller may control the power supply to prevent power from being output to the external electronic device if normal data communication with the external electronic device is not possible.

The controller may determine whether the external electronic device is a device to which power is supplied from the electronic device. The controller may control to transmit a signal for requesting a response to whether power is supplied to the external electronic device, and determine whether a device is a device to which power is supplied, according to receiving a signal corresponding to the request signal. As a result of the determination of whether a device is a device to which power is supplied, if the external electronic device is a device to which power is supplied, the controller may control the power supply to maintain the power output to the external electronic device.

As a result of the determination of whether data communication is possible, if data communication of the external electronic device is possible, the controller may control the power supply to maintain the power output to the external electronic device.

The controller may identify an internal resistance value of the external electronic device by measuring a signal input through the ID pin connected to the connection unit, and determine whether the external electronic device is a device to which power may be supplied from the electronic device by using the internal resistance value which was identified.

Figure 4:
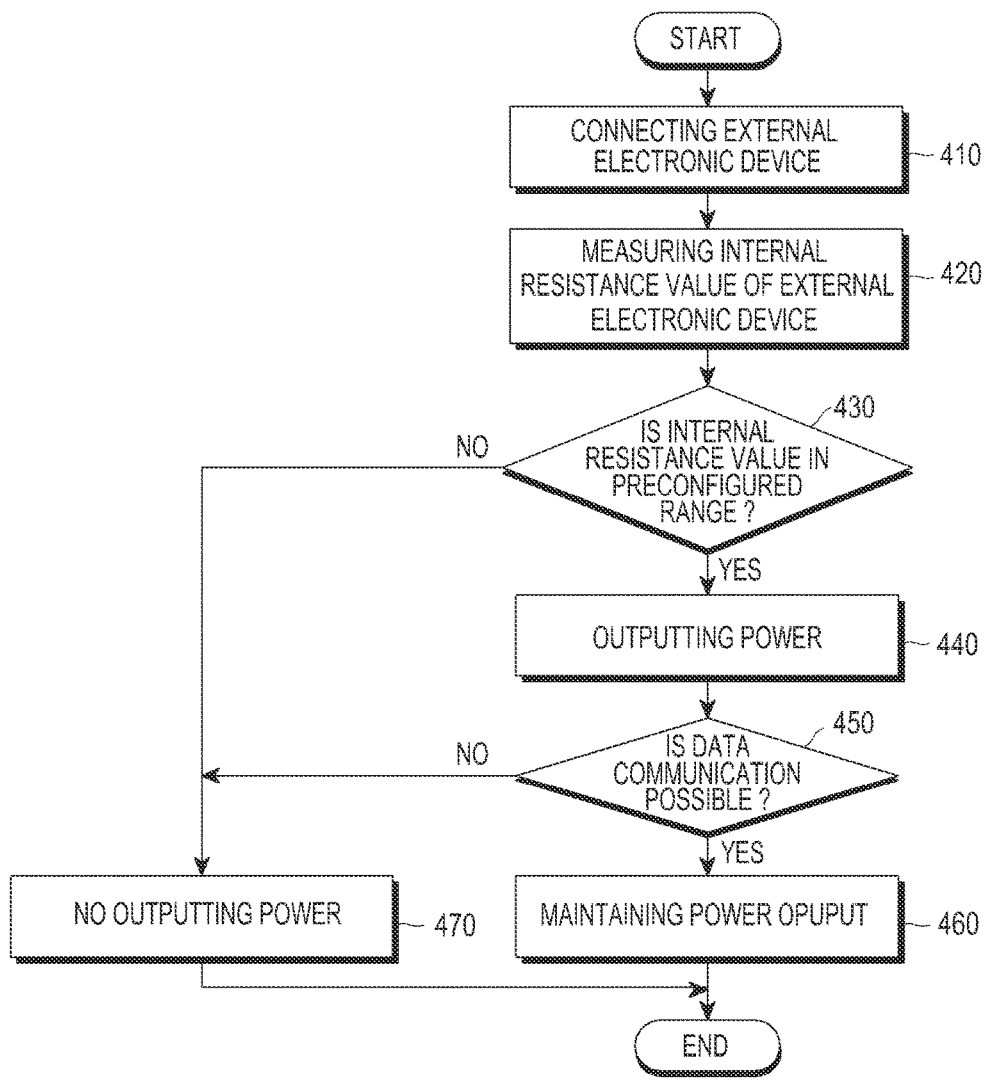
FIG. 4 is a view illustrating an example of operation flow of an electronic device according to an embodiment of the present disclosure.

FIG. 4 is a view illustrating an example of operation flow of an electronic device according to an embodiment of the present disclosure.

Referring to FIG. 4, the electronic device may recognize that it is connected to the external electronic device, in operation 410. For example, the electronic device may recognize that it is connected to the external electronic device by measuring a signal which is input and output through the connection unit 230. In operation 420, the electronic device may measure an internal resistance value of the connected external electronic device. For example, the electronic device may measure the internal resistance value of the external electronic device by measuring a signal input through the ID pin of the connector. Further, the electronic device may determine whether the internal resistance value is a value within a preconfigured range (for example, 0 to 32 ohm), in operation 430. As a result of the determination, if the internal resistance value is a value outside of the preconfigured range, the electronic device may control to prevent power from being output to the external electronic device in an operation 470.

Meanwhile, if the internal resistance value is a value within the preconfigured range, the electronic device may control to output power to the external electronic device, in operation 440. Further, the electronic device may determine whether a data communication with the external electronic device outputting power is possible, in operation 450. Further, the electronic device may determine whether data communication with the external electronic device, to which power is being output from the electronic device, is possible. As a result of the determination, if the data communication is possible, the electronic device may maintain the output of power which is being output to the external electronic device, in operation 460. On the other hand, if the data communication is not possible, the electronic device may control to stop power, which is being output to the external electronic device, from being output, in operation 470.

According to various embodiments of the present disclosure, the electronic device may control to prevent power from being output if it is normally connected to the external electronic device, but data communication with the external electronic device is actually impossible, by determining whether the data communication with the external electronic device is possible. Therefore, the corrosion of the connector which may occur by outputting power to the external electronic device, with which data communication is impossible, may be prevented.

According to an embodiment, the external electronic device, for example, may be the electronic device with which data communication with the electronic device is impossible, and to which only power may be supplied from the electronic device, such as a USB fan. As a preparation for this case, whether data communication between the electronic device and the external electronic device is possible, as well as whether the corresponding external electronic device is a device to which power is supplied from the electronic device, may be further determined. The specific description of this will be described below with reference to FIG. 5.

Figure 5:
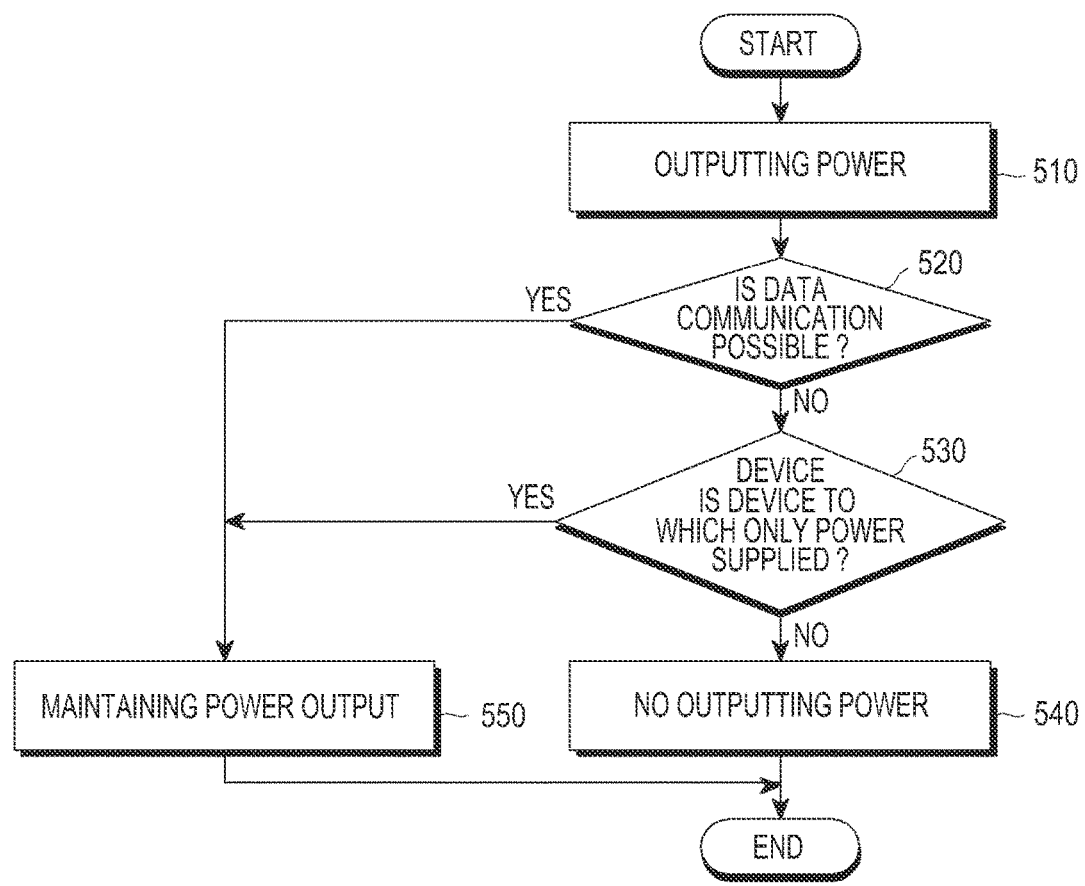
FIG. 5 is a view illustrating an example of operation flow of an electronic device according to an embodiment of the present disclosure.

FIG. 5 is a view illustrating an example of operation flow of an electronic device according to an embodiment of the present disclosure.

Referring to FIG. 5, the electronic device may output power to the connected external electronic device, in operation 510. Thereafter, the electronic device may determine whether data communication with the external electronic device is possible, in operation 520. As a result of the determination, if the data communication is possible, the electronic device may maintain the output of the power to the external electronic device, in operation 550. Meanwhile, if data communication is impossible, the electronic device may determine whether the external electronic device is a device for which only the power supply is required, in operation 530. For example, the determination of whether the external electronic device is a device for which only the power supply is required may be determined by displaying a message determining whether the external electronic device was connected to the electronic device on the screen of the electronic device, and identifying the user's identification response to the displayed message.

As a result of the determination, if the external electronic device is a device capable of power supply and other communication functions, the electronic device does not output power to the external electronic device, in operation 540. Meanwhile, if the external electronic device is a device for which power supply is required, the electronic device may maintain the output of power which is being output to the external electronic device, in operation 550.

The electronic device according to another embodiment of the present disclosure may determine whether data communication with the external electronic device is possible, as well as whether power is supplied. Therefore, the power output to the external electronic device, with which data communication is impossible, but to which power may be supplied from the electronic device, may be also controlled.

For example, the method of controlling the power output by the electronic device according to various embodiments of the present disclosure may perform an operation for determining whether power is supplied, by checking the connection unit of the electronic device, an operation for determining whether data communication with the external electronic device is possible, based on the determination, and an operation for controlling the output of power through the connection unit, based on a result of the determining whether data communication is possible.

The operation for controlling the output of power may perform an operation for controlling to prevent power from being output to the external electronic device if normal data communication with the external electronic device is not possible. Further, the operation for controlling the output of power may perform an operation for determining whether the external electronic device is a device to which power is supplied from the electronic device.

The operation for determining whether the device is a device to which power is supplied may perform an operation for transmitting a signal requesting a response to whether power is supplied to the external electronic device, and an operation for determining whether the device is a device to which power is supplied, according to receiving a signal corresponding to the request signal.

As a result of the determination of whether the device is a device to which power is supplied, if the external electronic device is the device to which power is supplied, an operation is performed for controlling to maintain the power output to the external electronic device. Meanwhile, as a result of the determination of whether data communication is possible, if data communication of the external electronic device is possible, an operation for maintaining the power output to the external electronic device may be further performed.

An operation for identifying the internal resistance value of the external electronic device by measuring a signal input through the ID pin connected to the connection unit and an operation for determining whether the external electronic device is the device to which power may be supplied from the electronic device, by using the internal resistance value which was identified, may be further performed.

In this way, various embodiments can be made according to various additional applications or modifications and variations of the present disclosure. Thus, the scope of the present disclosure should be determined by not the described embodiments but the appended claims and equivalents of the claims.

It will be appreciated that the various embodiments of the present disclosure may be implemented in a form of hardware, software, a combination of hardware and software. Any such software may be stored, for example, in a volatile or non-volatile storage device such as a Read Only Memory (ROM), a memory such as a Random Access Memory (RAM), a memory chip, a memory device, an Integrated Circuit (IC), an optical or magnetic recordable and machine (e.g., computer) readable medium such as a Compact Disc (CD), a Digital Versatile Disc (DVD), a magnetic disk, or a magnetic tape, regardless of its ability to be erased or its ability to be re-recorded. It will be appreciated that a memory, which may be incorporated in a portable terminal, may be an example of a machine-readable storage medium which is suitable for storing a program or programs including commands to implement the various embodiments of the present disclosure. Accordingly, the present disclosure includes a program that includes a code for implementing an apparatus or a method defined in any claim in the present specification and a machine-readable storage medium that stores such a program. Further, the program may be electronically transferred by a predetermined medium such as a communication signal transferred through a wired or wireless connection, and the present disclosure appropriately includes equivalents of the program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling a power output by an electronic device, the method comprising:
    controlling a power supply to supply power to an external electronic device through a connection unit of the electronic device, based on determining a connection between the electronic device and the external electronic device by checking the connection unit;
    determining whether data communication with the external electronic device is available based on determining a signal from a positive data line (D+) pin and a negative data line (D−) pin which are included in the connection unit;
    determining whether the external electronic device is configured to receive power from the electronic device if the data communication with the external electronic device is not available;
    displaying an identification request message on a display of the electronic device if the external electronic device is configured to receive power from the electronic device; and
    controlling the power supply to prevent power from being output to the external electronic device, based on a user's response to the displayed identification request message.

2. The method of claim 1, further comprising:
    if the data communication with the external electronic device is available, controlling to prevent the power from being output to the external electronic device.

3. The method of claim 2, wherein the determination of whether the data communication with the external device is available comprises:
    sending a signal; and
    if a response to the signal is not received within a predetermined time, determining therefrom that the data communication is not available.

4. The method of claim 1, further comprising:
    when the data communication with the external device is not available, determining whether the external electronic device comprises a device to which only power is to be supplied from the electronic device.

5. The method of claim 4, wherein the determination of whether the external electronic device comprises the device to which only power is to be supplied from the electronic device comprises:
    transmitting a request signal requesting a response to whether only power is to be supplied to the external electronic device; and
    determining whether the device comprises the device to which only power is to be supplied, according to a received signal corresponding to the request signal.

6. The method of claim 5, further comprising:
    controlling to maintain a power output to the external electronic device if the external electronic device comprises the device to which only power is to be supplied, as a result of the determination of whether the device comprises the device to which only power is to be supplied.

7. The method of claim 1, further comprising:
    maintaining the power output to the external electronic device if data communication with the external electronic device is available, according to the determination of whether the data communication with the external electronic device is available.

8. The method of claim 1, further comprising:
    identifying an internal resistance value of the external electronic device by measuring a signal input through an IDentification (ID) pin connected to the connection unit; and
    determining whether the external electronic device comprises a device to which power may be supplied from the electronic device according to the internal resistance value which was identified.

9. The method of claim 8, wherein the signal comprises the internal resistance value being within a preconfigured range.

10. An electronic device for controlling a power output, the electronic device comprising:
    a connection unit;
    a power supply configured to output power to an external electronic device through the connection unit; and
    a controller configured to:
        control the power supply to supply power to the external electronic device, based on determining a connection between the electronic device and the external electronic device by checking the connection unit through the connection unit,
        determine whether data communication with the external electronic device is available based on determining a signal from a positive data line (D+) pin and a negative data line (D−) pin which are included in the connection unit, determine whether the external electronic device is configured to receive power from the electronic device if the data communication with the external electronic device is not available;

display an identification request message on a display of the electronic device if the external electronic device is configured to receive power from the electronic device; and control the power supply to prevent power from being output to the external electronic device based on a user's response to the displayed identification request message.

11. The electronic device of claim 10, wherein the controller is further configured to control the power supply to prevent the power from being output to the external electronic device if the data communication with the external electronic device is available.

12. The electronic device of claim 11, wherein the determination of whether the data communication with the external device is available comprises:

sending a signal; and if a response to the signal is not received within a predetermined time, determining therefrom that the data communication is not available.

13. The electronic device of claim 10, wherein, when the data communication with the external device is not available, the controller is further configured to determine whether the external electronic device comprises a device to which only power is to be supplied from the electronic device.

14. The electronic device of claim 13, wherein the controller is further configured control the connection unit to transmit a request signal requesting a response to whether only power is to be supplied to the external electronic device, and to determine whether the external electronic device comprises the device to which only power is to be supplied according to a received signal corresponding to the request signal.

15. The electronic device of claim 14, wherein the controller is further configured to control the power supply to maintain the power output to the external electronic device if the external electronic device comprises the device to which only power is to be supplied, according to the determination of whether the device comprises the device to which only power is to be supplied.

16. The electronic device of claim 10, wherein the controller is further configured to control the power supply to maintain the power output to the external electronic device if the data communication with the external electronic device is available, according to the determination of whether the data communication with the external electronic device is available.

17. The electronic device of claim 10, wherein the controller is further configured to identify an internal resistance value of the external electronic device by measuring a signal input through an IDentification (ID) pin connected to the connection unit, and determines whether the external electronic device comprises a device to which power is to be supplied from the electronic device by using the identified internal resistance value.

18. The electronic device of claim 17, wherein the signal comprises the internal resistance value being within a preconfigured range.

19. A computer-readable storage medium storing instructions which when executed cause a digital computer to execute a method for controlling a power output by an electronic device, the method comprising:

controlling a power supply to supply power to an external electronic device through a connection unit of the electronic device, based on determining a connection between the electronic device and the external electronic device by checking the connection unit;

determining whether data communication with the external electronic device is available based on determining a signal from a positive data line (D+) pin and a negative data line (D−) pin which are included in the connection unit;

determining whether the external electronic device is configured to receive power from the electronic device if the data communication with the external electronic device is not available;

displaying an identification request message on a display of the electronic device if the external electronic device is configured to receive power from the electronic device; and controlling the power supply to prevent power from being output to the external electronic device, based on a user's response to the displayed identification request message.

* * * * *